(12) United States Patent
Eitel et al.

(10) Patent No.: US 8,696,856 B2
(45) Date of Patent: *Apr. 15, 2014

(54) METHOD AND INSTALLATION FOR APPLYING FOIL MATERIAL ONTO SUCCESSIVE SHEETS

(75) Inventors: Johann Emil Eitel, Thungen (DE); Matthias Gygi, Schmitten (CH); Kurt Georg Nagler, Wurzburg (DE)

(73) Assignee: KBA-Notasys SA, Lausanne (CH)

( * ) Notice: Subject to any disclaimer, the term of this patent is extended or adjusted under 35 U.S.C. 154(b) by 17 days.

This patent is subject to a terminal disclaimer.

(21) Appl. No.: 13/027,083

(22) Filed: Feb. 14, 2011

(65) Prior Publication Data

US 2011/0139362 A1 Jun. 16, 2011

Related U.S. Application Data

(63) Continuation of application No. 12/528,111, filed as application No. PCT/IB2008/050626 on Feb. 21, 2008, now Pat. No. 7,922,858.

(30) Foreign Application Priority Data

Feb. 26, 2007 (EP) ..................... 07103051

(51) Int. Cl.
*B29C 65/48* (2006.01)
*B32B 37/00* (2006.01)
*B32B 38/04* (2006.01)

(52) U.S. Cl.
USPC ........... 156/268; 156/265; 156/270; 156/257; 156/64; 156/378; 156/303

(58) Field of Classification Search
USPC ........... 156/253, 273, 268, 270, 64, 378, 353, 156/291, 265, 257, 303, 522
See application file for complete search history.

(56) References Cited

U.S. PATENT DOCUMENTS

| | | |
|---|---|---|
| 3,539,417 A | 11/1970 | Black |
| 4,216,046 A | 8/1980 | Hackert |
| 4,405,401 A | 9/1983 | Stahl |

(Continued)

FOREIGN PATENT DOCUMENTS

| | | |
|---|---|---|
| EP | 0 965 446 | 12/1999 |
| JP | 8-30196 | 2/1996 |

(Continued)

*Primary Examiner* — Linda L. Gray
(74) *Attorney, Agent, or Firm* — Seager, Tufte & Wickhem LLC

(57) ABSTRACT

There is described a method for applying foil material onto successive sheets, especially sheets of securities. In a first step, individual sheets are transported in succession along a sheet transport path. In a second step, at least one continuous band of foil material is applied onto the individual sheets along a direction substantially parallel to a direction of displacement of the individual sheets, thereby forming a continuous flow of sheets linked to one another by the said at least one continuous band of foil material. In a third step, the said at least one continuous band of foil material is cut such that the continuous flow of sheets is again separated into individual sheets with portions of foil material remaining on the sheet. The cutting is performed at positions located on the sheets such that said portions of foil material remaining on the sheets do not extend beyond leading and trailing edges of the sheets. There is also described an installation for carrying out the above method.

28 Claims, 11 Drawing Sheets

(56) References Cited

U.S. PATENT DOCUMENTS

| | | | |
|---|---|---|---|
| 4,594,125 A * | 6/1986 | Watson | 156/516 |
| 4,650,536 A | 3/1987 | Ceraso | |
| 4,702,789 A | 10/1987 | Ceraso | |
| 4,882,004 A | 11/1989 | Watson | |
| 5,653,846 A | 8/1997 | Onodera et al. | |
| 5,691,023 A | 11/1997 | Keller | |
| 5,707,475 A | 1/1998 | Steidinger et al. | |
| 5,937,759 A | 8/1999 | Mitsam et al. | |
| 6,062,134 A | 5/2000 | Eitel et al. | |
| 6,112,651 A | 9/2000 | Eitel et al. | |
| 6,142,069 A | 11/2000 | Eitel et al. | |
| 6,182,959 B1 | 2/2001 | Eitel et al. | |
| 6,202,549 B1 | 3/2001 | Mitsam et al. | |
| 6,263,790 B1 | 7/2001 | Wyssmann et al. | |
| 6,387,202 B1 | 5/2002 | Grosskopf et al. | |
| 6,428,051 B1 | 8/2002 | Hermann et al. | |
| 6,508,489 B2 | 1/2003 | Hermann et al. | |
| 6,837,956 B2 | 1/2005 | Cowell et al. | |
| 7,922,858 B2 * | 4/2011 | Eitel et al. | 156/268 |
| 2002/0030360 A1 | 3/2002 | Hermann et al. | |
| 2005/0166771 A1 | 8/2005 | Gygi et al. | |
| 2005/0241445 A1 | 11/2005 | Schaede | |
| 2006/0185790 A1 | 8/2006 | Eckstein et al. | |
| 2006/0231537 A1 | 10/2006 | Schaede | |
| 2007/0029784 A1 | 2/2007 | Moreau | |
| 2007/0235120 A1 | 10/2007 | Poole et al. | |
| 2008/0271854 A1 | 11/2008 | Eitel et al. | |
| 2009/0173430 A1 | 7/2009 | Schaede | |

FOREIGN PATENT DOCUMENTS

| | | |
|---|---|---|
| JP | 2005-274778 | 10/2005 |
| WO | 94/13487 | 6/1994 |
| WO | 95/10420 | 4/1995 |
| WO | 97/01442 | 1/1997 |
| WO | 97/35721 | 10/1997 |
| WO | 97/35794 | 10/1997 |
| WO | 97/35795 | 10/1997 |
| WO | 97/36756 | 10/1997 |
| WO | 03/043823 | 5/2003 |
| WO | 03/092971 | 11/2003 |
| WO | 2004/024464 | 3/2004 |
| WO | 2004/096482 | 11/2004 |
| WO | 2004/096541 | 11/2004 |
| WO | 2005/068211 | 7/2005 |
| WO | 2005/102733 | 11/2005 |

* cited by examiner

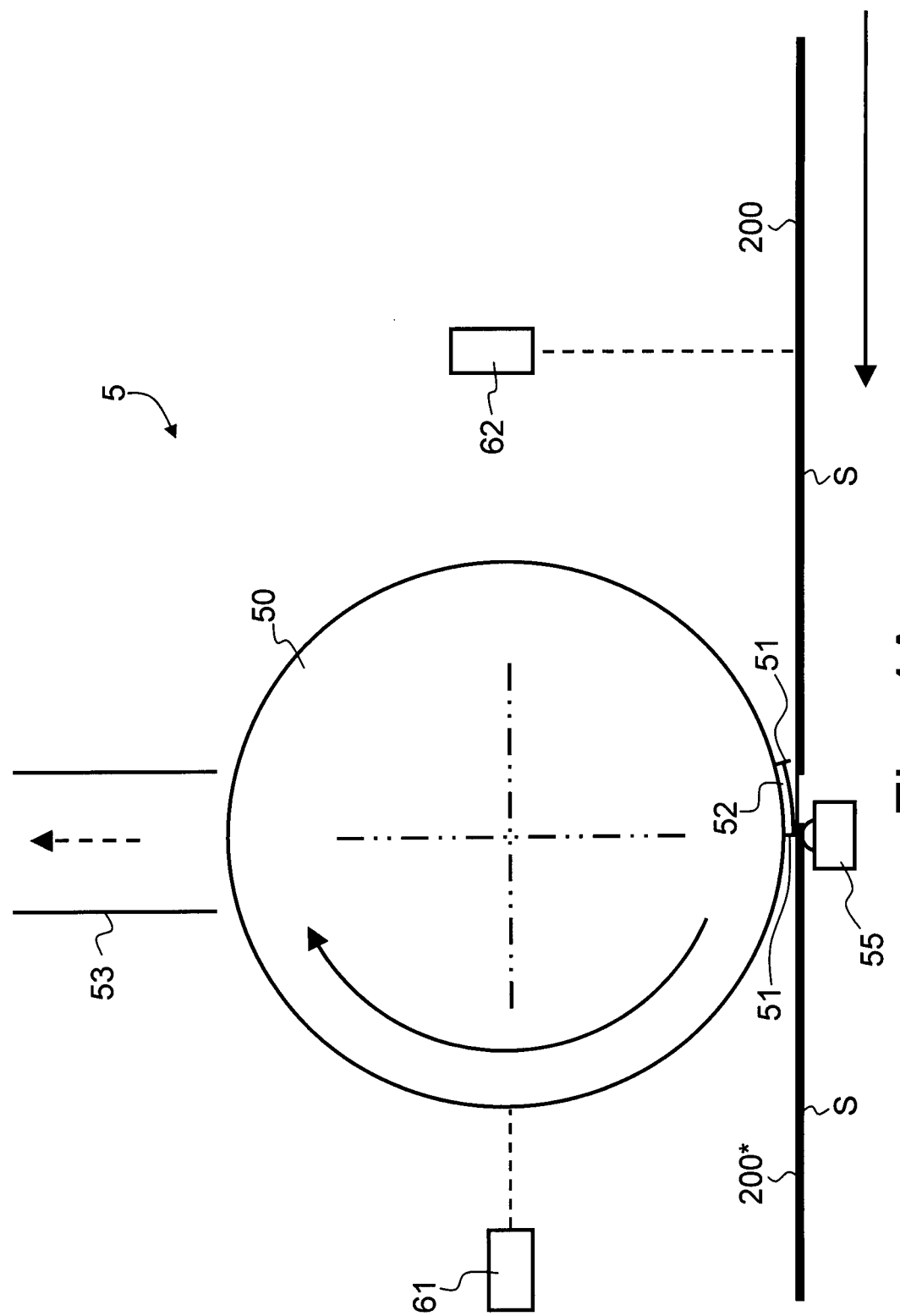

METHOD AND INSTALLATION FOR APPLYING FOIL MATERIAL ONTO SUCCESSIVE SHEETS

RELATED APPLICATIONS

This application is a continuation of U.S. application Ser. No. 12/528,111, filed Aug. 21, 2009 now U.S. Pat. No. 7,922,858, which is the National Stage of International Application No. PCT/IB2008/050626, filed Feb. 21, 2008, the entire disclosure of which is incorporated herein by reference.

TECHNICAL FIELD

The present invention generally relates to a method and installation for applying foil material onto successive sheets, especially sheets of securities. The present invention is especially applicable in the context of the production of security documents, such as banknotes.

BACKGROUND OF THE INVENTION

The application of foil material onto sheets, especially sheets of securities, is as such already well-known in the art. Such application is typically aimed at providing securities with additional security elements, such as in particular so-called OVD's (Optically Variable Devices). OVD's typically take the form of a patch or foil laminate comprising an optically-diffractive layer (usually a metalized layer) producing optically variable effects. OVD's are in particular known under the name of KINEGRAM®, which is a registered trademark of OVD Kinegram AG, a member of the Leonhard Kurz Group.

OVD's are typically supplied in the form of a continuous film or band of carrier material carrying transfer elements that are to ultimately form the actual OVD's. These are usually applied using so-called hot-foil stamping techniques, which make use of combined pressure and temperature to activate an adhesive layer provided on the transfer elements and cause transfer thereof from the carrier material onto the sheets or web being processed.

Method and installations for carrying out hot-foil stamping techniques are disclosed for instance in International applications nos. WO 94/13487 A1, WO 97/01442 A1, WO 97/35721 A1, WO 97/35794 A1, WO 97/35795 A1, WO 97/36756 A1, WO 03/043823 A1, WO 2005/102733 A2, and European patent application EP 0 965 446 A1.

Besides the application of OVD's on securities, it has also been proposed to cut windows in the securities and cover these windows with a film of foil material, usually transparent. Such a solution is for instance proposed in International application no. WO 95/10420 A1. In contrast to OVD's, the layer of foil material that is applied to cover windows is comparatively thicker and more resistant as it has to withstand greater mechanical constraints and be self-supporting in the region of the window.

Similarly, it has also been proposed to reinforce regions of reduced thickness created in securities by the provision of a film of foil material onto said regions. A method for reinforcing security documents provided with at least one zone of reduced thickness is for instance disclosed in International application no. WO 2004/024464 A1.

Provision of windows in securities can be carried out in different ways. A method and installation for cutting windows in sheets using mechanical cutting tools is for instance disclosed in International application no. WO 03/092971 A1. A method and installation for cutting windows in sheets using a laser-cutting tool is for instance disclosed in International application no. WO 2004/096482 A1.

Covering of the windows by foil material is discussed in greater detail in International applications nos. WO 2004/096541 A1 and WO 2005/068211 A1.

According to International application no. WO 2004/096541 A1, foil material is applied in the form of successive strips of foil material that are cut upstream of an application unit. The application unit is basically similar to those used for carrying out hot-foil stamping with the main difference that the strips of foil material are completely transferred onto the sheets. In this context, it is more appropriate to say that the application unit performs lamination of the foil material onto the sheets, rather than stamping, which process involves transfer of an element from a carrier band onto the sheets and recuperation of the used carrier band.

The solution of International application no. WO 2004/096541 A1 has been found to be rather difficult to implement as it requires precise cutting and positioning of the cut strips of laminate with respect to the sheets. This prior art solution in particular requires a specifically-designed aspiration system to properly seize and transport the strips of laminate such that these are brought in contact with the sheets at the desired locations.

The solution of International application no. WO 2004/096541 A1 is furthermore only applicable for strips of laminate having a minimum length and is in particular not suited for applying small-sized patches of foil material onto the sheets.

There is therefore a need for an improved method and installation for applying foil material onto successive sheets.

SUMMARY OF THE INVENTION

A general aim of the invention is thus to improve the known methods and installations for applying foil material onto successive sheets.

An aim of the invention is in particular to provide a solution that is less complicated to implement than the known solutions.

A further aim of the present invention is to provide a solution that allows application of foil material in a precise manner onto the sheets.

Still another aim of the present invention is to provide a solution that allows application of foil material onto the sheets without this affecting further processing of the said sheets in the downstream processes.

Yet another aim of the present invention is to provide a solution that is capable of applying a wide range of sizes of portions of foil material onto the sheets.

These aims are achieved thanks to the solution defined in the claims.

The method according to the invention comprises the following steps. In a first step, individual sheets are transported in succession along a sheet transport path. In a second step, at least one continuous band of foil material is applied onto the individual sheets along a direction substantially parallel to a direction of displacement of the individual sheets, thereby forming a continuous flow of sheets linked to one another by the said at least one continuous band of foil material. In a third step, the said at least one continuous band of foil material is cut such that the continuous flow of sheets is again separated into individual sheets with portions of foil material remaining on the sheet. Cutting of the said at least one continuous band of foil material is performed at positions located on the sheets such that the portions of foil material remaining on the sheets do not extend beyond leading and trailing edges of the sheets.

Thanks to the above method, a precise application of the foil material onto the successive sheets is ensured, while guaranteeing that the applied foil material does not cause perturbations during further processing of the sheets in the downstream processes. Indeed, as cutting of the foil material is performed at positions located on the sheets such that the portions of foil material remaining on the sheets do not extend beyond the leading and trailing edges of the sheets, proper alignment of the sheets in the downstream processes (which alignment uses as reference the leading edge of the edge, or as the case may be the trailing edge) is not affected.

A priori, cutting of the foil material at positions located on the sheets would appear to be detrimental to the integrity of the sheets. Tests have however shown that cutting of the foil material can be carried out on the surface of the sheets without any major problem.

Advantageous embodiments of the invention form the subject-matter of the dependent claims and are discussed below.

According to one embodiment of the invention, cutting can for instance be performed by mechanical cutting tools without causing damage to the sheets. According to an alternate embodiment, and provided the foil material is made of plastic or any other material that can be melted, cutting can be carried by melting the foil material using a heating element (such as a heated electrical wire). Still according to an alternate embodiment, cutting of the foil material can be carried out using a laser beam. Tests carried out by the Applicant have demonstrated that laser cutting is in particular very efficient at selectively cutting the foil material without damaging the sheets.

According to an advantageous embodiment, cutting of the said at least one continuous band of foil material is performed immediately after a leading edge of the sheets and immediately before a trailing edge of the sheets over a whole width of the continuous band of foil material, such that a continuous portion of foil material is left remaining on each sheet. In such case, it is in particular preferable to carry out cutting in unprinted margins of the sheets.

According to an alternate embodiment, cutting of the said at least one continuous band of foil material is performed at a plurality of locations along a length of the continuous band of foil material, such that a plurality of distinct portions of foil material are left remaining on each sheet. In such case, the plurality of distinct portions remaining on the sheets can have a width smaller than a width of the continuous band of foil material, the remaining portions of the continuous band of foil material that is not to remain on the sheets forming a contiguous band of material that can be recuperated, for instance by winding around a recuperating roll.

Still according to an advantageous embodiment, the remaining portions of the continuous band or bands of foil material that are not to remain on the sheets are evacuated, preferably by aspiration.

In the context of the invention, the continuous band or bands of foil material can advantageously be supplied in the form of a roll of foil material.

In the context of the production of documents, such as security documents, wherein the sheets each carry an array of imprints arranged in a matrix of rows and columns, at least one continuous band of foil material is applied along each column of imprints.

The present invention is in particular applicable to cover windows or openings cut into the sheets prior to the application of the continuous band or bands of foil material. In this case in particular, it is advantageous to apply a foil material that is substantially transparent.

The foil material is preferably a plastic laminate comprising an adhesive layer which is brought into contact with the surface of the sheets. This adhesive layer is advantageously a pressure-activated and/or thermo-activated adhesive layer which is activated during application only at locations corresponding to the portions of foil material that are to remain on the sheets. Cutting is preferably carried out in this case at locations where the adhesive layer has not been activated, advantageously in an immediate vicinity of the portions of foil material that are to remain on the sheets. In this case, while peripheral portions of the foil material are not adhering to the sheets after the application process, the dimensions thereof can be minimized. Furthermore, it is common practice to subject the sheets after application of foil material to an intaglio printing process, especially in order to overprint the foil material. As a result of intaglio printing, the peripheral portions of the foil material are made to adhere to the sheets due to the combined effect of temperature and pressure inherent to intaglio printing.

An installation for carrying out the above method forms the subject-matter of dependent claims, which installation generally comprises:

a sheet-by-sheet feeding station for feeding the individual sheets;

a foil application unit for applying the said at least one continuous band of foil material onto the individual sheets;

cutting unit, located downstream of the foil application unit, for cutting the said at least one continuous band of foil material; and a sheet delivery station for receiving the individual sheets.

According to a preferred embodiment of the installation, the cutting unit comprises a cutting cylinder carrying at least one cutting tool on its outer circumference, which cutting cylinder is rotated in synchronism with the sheets. This cutting cylinder preferably comprises at least one cutting blade for mechanically cutting the continuous band of foil material or a heating element for cutting the continuous band of foil material by melting. A temperature of the cutting cylinder can furthermore advantageously be regulated so as to prevent dilatation of the cutting cylinder which could affect the accuracy of the cutting operations.

According to an alternate embodiment, a laser cutting tool can be used to perform the cutting operation.

The installation is advantageously further provided with means for evacuating remaining portions of the continuous band of foil material that are not to remain of the sheets, preferably by aspiration. A device for checking that these remaining portions are properly being evacuated is preferably further provided.

According to still another preferred embodiment of the installation, means are further provided for checking passage of a leading and/or trailing edge of the sheets and adjusting operation of the cutting unit as a function of the passage of the leading and/or trailing edge of the sheets. This ensures a stable operation and precise cutting of the foil material at determined locations on each sheet.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which:

FIGS. 4A to 4E are schematic side views illustrating operation of a cutting cylinder used as a cutting unit for cutting the foil material according to one variant of the invention;

DETAILED DESCRIPTION OF EMBODIMENTS OF THE INVENTION

Figure 1:
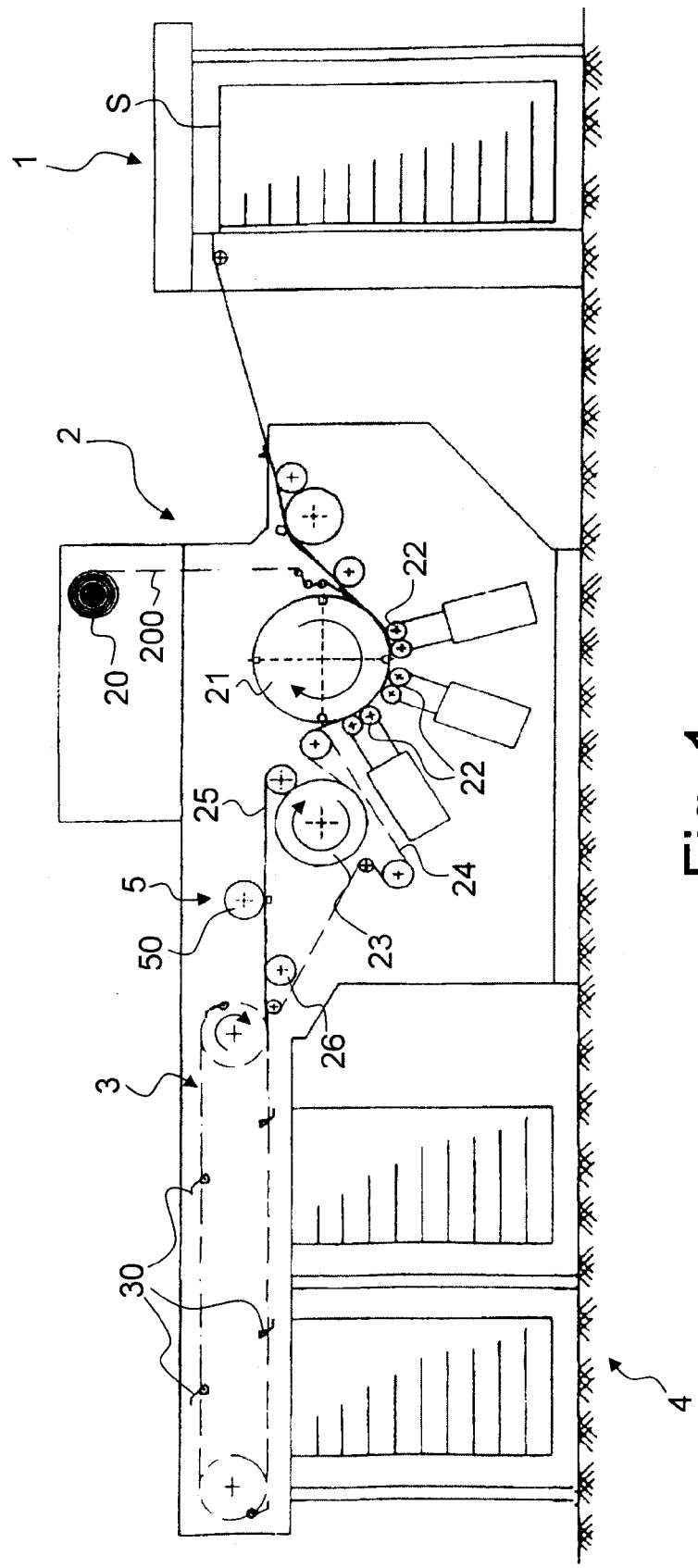
FIG. 1 is a schematic side view of a sheet-fed processing machine for applying foil material onto successive sheets according to one embodiment of the invention.

FIG. 1 is a schematic side view of a sheet-fed processing machine for applying foil material onto successive sheets according to one embodiment of the invention. The configuration thereof is almost identical to the hot-foil stamping machines of the prior art, as for instance disclosed in International applications nos. WO 97/35721 A1, WO 97/35794 A1, WO 97/35795 A1 and WO 97/36756 A1, the disclosures of which are incorporated herein by reference. It comprises a sheet-by-sheet feeding station 1 for feeding individual sheets S to a foil application unit 2, which foil application unit 2 basically comprises an application cylinder 21 (in this case a four-segment cylinder having four segments each capable of seizing and transporting a sheet coming from the sheet-by-sheet feeding station 1) that cooperates with a plurality of rows of pressure rollers 22 which are pressed resiliently against the circumference of the application cylinder 21 by means of pneumatic cylinders (not referenced). In this case, three pairs of rows of pressure rollers 22 are pressed against the circumference of the application cylinder 21.

Foil material is supplied from a supply roll 20 in the form of a continuous band of foil material 200. This continuous band 200 is fed to the application cylinder 21 so as to be sandwiched between the circumference of the application cylinder 21 and the sheets S. In the context of the production of security documents, such as banknotes, each sheet S is typically provided with an array of imprints P arranged in a matrix of rows and columns (as is for instance illustrated in FIGS. 2 and 3). One will thus understand that at least one supply roll 20 will be provided so as to supply a corresponding band of foil material 200 along each column of imprints P.

The foil material 200 is preferably made of a plastic laminate, preferably substantially transparent, such as, but not limited to, a polyester (PET) or polycarbonate (PC) material, comprising an adhesive layer which is brought into contact with the surface of the sheets. This foil material 200 can optionally be provided with a partially demetallized layer as for instance sold under the name of KINEGRAM Zero.Zero®, which is a registered trademark of OVD Kinegram AG.

The adhesive layer is preferably a pressure-activated and/or temperature-activated adhesive layer which is activated during application only at locations corresponding to the portions of foil material that are to remain on the sheets. Alternatively, a two-compound adhesive could be used wherein one adhesive compound is applied on the foil material and the other adhesive compound is applied onto the sheets prior to foil application (such as discussed for instance in International application no. WO 2005/068211 A1).

The application cylinder 21 is provided with a plurality of heated stamping members (not shown) at the locations where the foil material 200 is to be applied onto the sheets S. International application no. WO 2005/102733 A2, the disclosure of which is incorporated herein by reference, provides a detailed description of an application cylinder 21 equipped with such stamping members. It suffice to understand that the stamping members are dimensioned according to the portions of adhesive layer to be activated on the foil material 200 and that the pressure rollers 22 are designed for rolling contact with the said stamping members.

For instance, in the context of the embodiment illustrated by FIGS. 2 and 3, which embodiment will be discussed below, it is envisaged to apply each continuous band of foil material 200 so that a continuous portion thereof, designated by reference numeral 200*, is left remaining on each sheet S. In other words, each stamping member on the application cylinder 21 is dimensioned such as to exhibit the shape of a strip the length of which corresponds to the length of adhesive layer to be activated on the band of foil material 200.

Figure 2:
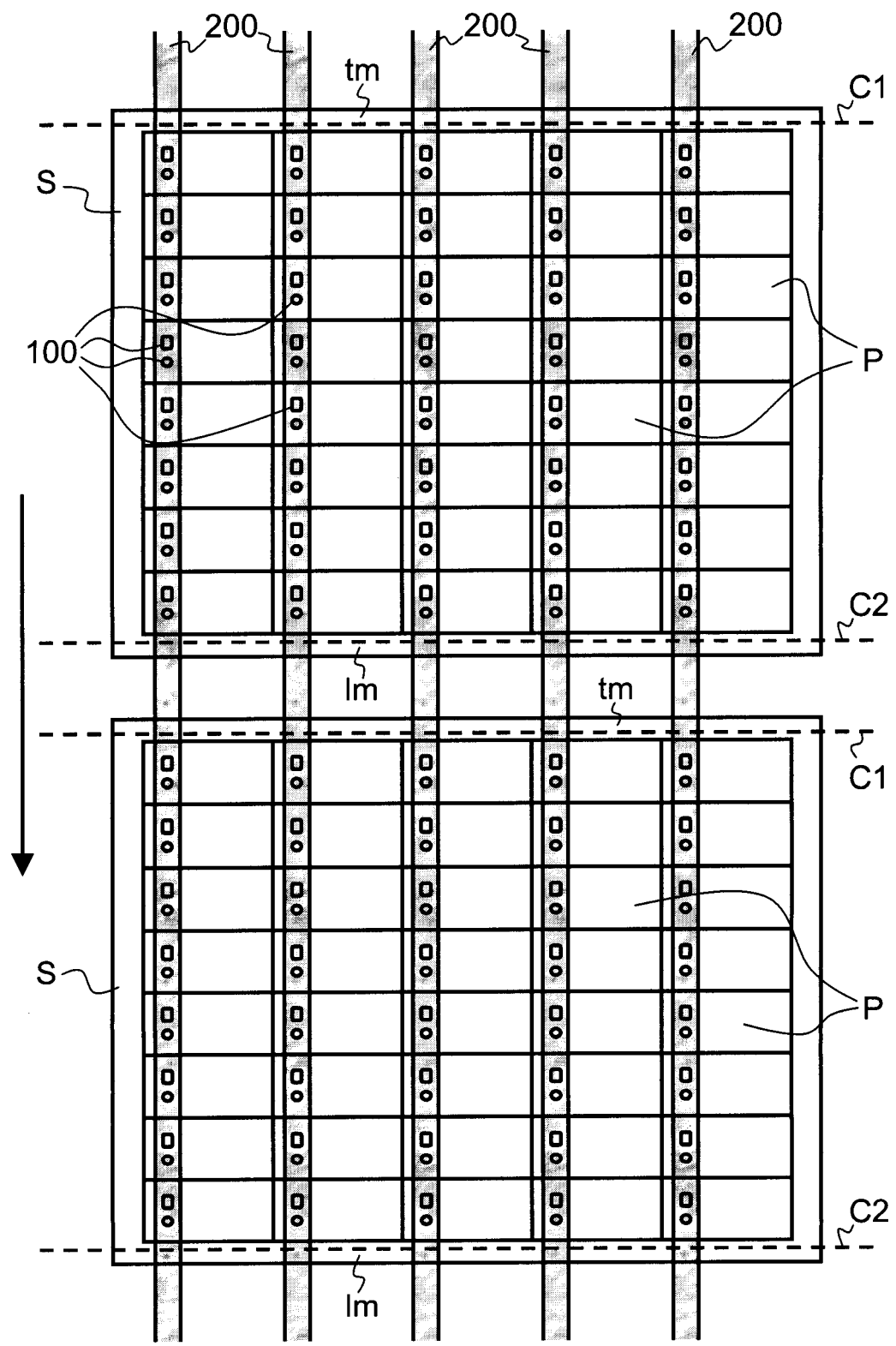
FIG. 2 is a schematic top view of two successive sheets linked to one another by a plurality of continuous bands of foil material which are applied onto the sheets along a direction parallel to a direction of displacement of the sheets.

Following application of the continuous bands of foil material 200 onto the individual sheets S, a continuous flow of sheets S linked to one another by the continuous bands of foil material 200 is formed, as schematically illustrated in FIG. 2.

Referring again to FIG. 1, the continuous flow of sheets S linked by the continuous bands of foil material 200 is fed to a cooling unit comprising a cooling roller 23 cooperating with conveyor belts 24. In the illustrated embodiment, the conveyor belts 24 are driven into rotation so as to turn in a counter-clockwise direction in FIG. 1 and draw the continuous flow of sheets S away from the surface of the application cylinder 21, against the circumference of the cooling roller 23 (which roller 23 rotates in the clockwise direction in FIG. 1), and onto a horizontal guide plate 25.

The cooling unit is not as such required and may be omitted. Tests have however shown that the cooling unit may be advantageous in that it enables stabilization and regulation of the temperature of the processed sheets S as well as of the downstream portion of the foil application unit 2 where the cutting unit, designated by reference numeral 5, is located.

The cutting unit 5, to be described in greater detail hereinafter, is located downstream of the foil application unit 2, in the vicinity of the horizontal guide plate 25, for cutting the continuous bands of foil material 200.

Figure 3:
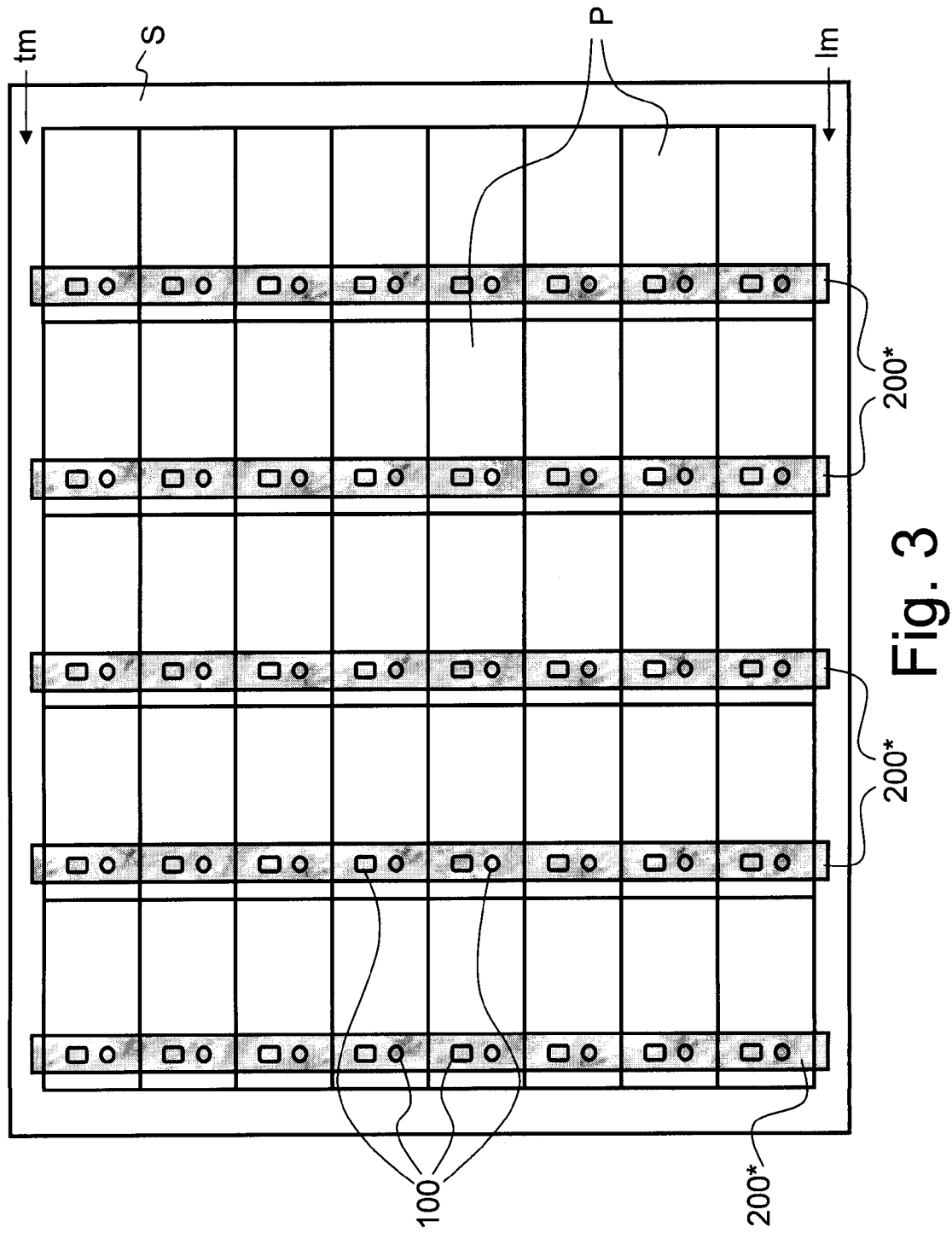
FIG. 3 is a schematic top view of a single sheet after cutting of the plurality of continuous bands of foil material of FIG. 2.

As a result of this cutting, the continuous flow of sheets S is again separated into individual sheets S with portions of foil material, designated by reference numeral 200* in FIG. 3, remaining on the sheets S. Such separation is necessary as the sheets S are to be transferred to a downstream-located chain conveyor system, designated generally by reference numeral 3 in FIG. 1.

As illustrated in FIG. 1, a suction drum 26 is located below the conveyor belts 24, downstream of the guide plate 25 and of the cutting unit 5. The circumferential surface of the suction drum 26 is tangent upon the plane in which the sheets S are conveyed in this region. The suction drum 26 preferably has a dedicated speed-controllable and/or position-controllable drive (not shown), comprising for instance an electric motor the speed of which can be adjusted. A circumferential speed of the suction drum 26 is controlled in such a manner that the suction drum 26 is initially at the conveying speed of the conveyor belts 24, is then accelerated to a speed which is slightly greater than the speed of the chain conveyor system 3, and is then decelerated again in order to permit transfer of the sheet S with which the suction drum 26 cooperates to a corresponding one of the gripper bars 30 of the chain conveyor system 3. This "overspeed" is required in order to cover a necessary travel of the sheet S between suction drum 26 and chain conveyor system 3.

Once transferred to the chain conveyor system 3, the processed sheets are then conveyed to a delivery pile unit of a sheet delivery station 4.

FIG. 2 is a schematic illustration of the flow of sheets S as it would be formed as a result of the application of the continuous bands of foil material 200 downstream of the application cylinder 21 in FIG. 1. In FIG. 2, reference numeral 100 designates windows that have been provided in the sheets S prior to the application of the continuous bands of foil material 200. Such windows 100 might be provided on-line in the same processing machine where the foil material 200 is applied (as for instance proposed in International application no. WO 2004/096541 A1) or in a separate machine.

In FIG. 2, which illustrates sheets S each carrying an array of imprints P arranged in eight rows and five columns (which matrix arrangement is purely illustrative), five continuous bands of foil material 200 are applied along a direction parallel to the sheet transport direction (indicated by the vertical arrows in FIG. 2), i.e. one continuous band 200 per column of imprints P. It shall be appreciated that more than one continuous band of foil material 200 could be applied per column of imprints P, for instance in case windows 100 are provided at more than one location along the length (i.e. transversely to the sheet transport direction) of each imprint P. In the illustrated example, each imprint P is provided with two windows 100 that are covered by the same band of foil material 200.

In FIG. 2, references lm and tm respectively designate a leading margin and trailing margin of the sheets S, i.e. portions of the sheets that do not carry any imprint P. While these margins will also be referred to as "unprinted margins", it shall be understood that such margins could nevertheless be provided with printed markings, for instance markings that are exploited in the context of logistic and/or quality management of the sheets.

In FIG. 2, the dashed lines designated by references C1 and C2 at the trailing and leading portions of the sheets, respectively, are indicative of the locations where cutting operations are to be carried out in the context of this first embodiment. In other words, according to this first embodiment, the continuous bands of foil material 200 are cut immediately after a leading edge of the sheets S (more precisely within the unprinted leading margin lm) and immediately before a trailing edge of the sheets S (more precisely within the unprinted trailing margin tm) over a whole width of the continuous bands 200. As a result, as illustrated by FIG. 3, continuous portions of foil material, which portions are designated by reference numerals 200*, are left remaining on each sheet S.

FIGS. 4A to 4E are schematic side views illustrating operation of the cutting unit 5 of FIG. 1 to perform cutting of the foil material in the manner illustrated in FIGS. 2 and 3.

Figure 5:
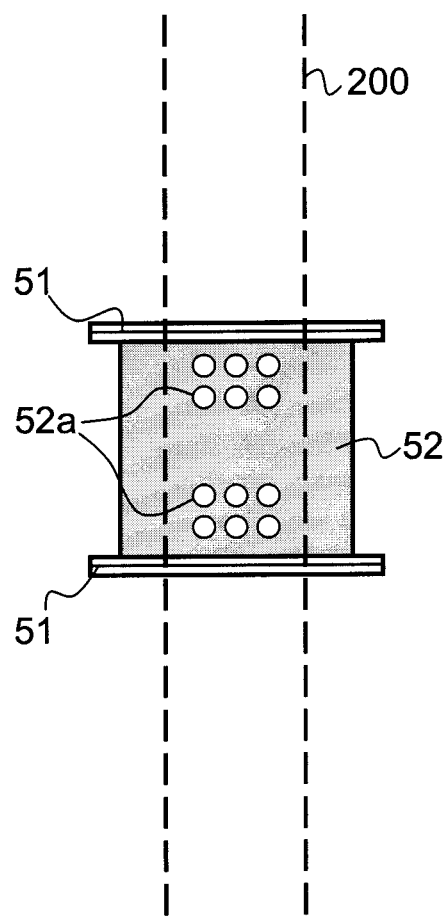
FIG. 5 is a schematic front view of a cutting arrangement of the cutting cylinder of FIGS. 4A to 4E.

According to this embodiment of the invention, the cutting unit 5 preferably comprises a cutting cylinder 50 carrying a cutting tool 51 on its outer circumference, which cutting cylinder 50 is rotated in synchronism with the sheets S. In this example, the cutting tool 51 comprises a pair of cutting blades that extend transversely to the length of the continuous band of foil material 200, as illustrated in FIG. 5. Between the cutting blades of the cutting tool 51 there is preferably provided a suction portion 52 with suction apertures 52*a* the purpose of which will be described hereinafter.

The cutting blades of the cutting tool 51 could alternatively be replaced by a pair of heating elements (such as electrical wires) designed to perform cutting of the bands of foil material 200 by melting, provided the foil material is a material that can be melted, such as a plastic material.

According to this embodiment, one will appreciate that the shortest distance between the two cutting blades of the cutting tool 51 (i.e. the distance where the suction portion 52 is located) corresponds to the distance between the cutting line C1 depicted in FIG. 2 in the trailing margin tm of a preceding sheet and the cutting line C2 in the leading margin lm of a subsequent sheet. Such distance will depend on the actual distance between two successive sheets and the actual positions where the cutting operations are to be carried out on the sheets. Accordingly, it might be advantageous to design the cutting cylinder 50 such that a distance between the cutting blades of the cutting tool 51 is adjustable.

A temperature of the cutting cylinder could advantageously be regulated so as to avoid modification of the distance between the cutting blades of the cutting tool 51 due to dilatation of the cylinder 50.

One will also appreciate that, in case the cutting cylinder 50 is rotated at a substantially constant speed together with the sheets S, the circumference of the cutting cylinder 50 should be such that is corresponds to the periodic distance between two successive sheets.

It is advantageous to provide the cutting cylinder 50 with its own speed-controllable and/or position-controllable drive so that adjustment of the angular position of the cutting cylinder 50 can be performed on the fly to ensure proper positioning of the cutting tool 51 with respect to the sheets and the bands of foil material 200.

FIG. 4A illustrates the cutting cylinder 50 positioned at a time corresponding to cutting of the bands of foil material 200 along the cutting line C1 depicted in FIG. 2, i.e. at the trailing portion of a sheet. In this situation, the first cutting blade of the cutting tool 51 is brought in contact with the foil material 200 applied on the sheet S, causing cutting thereof. A supporting member 55 is preferably provided on the opposite side of the sheet S as illustrated in FIG. 4A so as to provide a proper reference surface to support the sheet S and ensure a clean cutting of the band of foil material 200. The distance of the supporting member 55 with respect to the cutting blades of the cutting tool 51 is preferably adjustable. Following the cutting operation depicted in FIG. 4A, one will understand that portions 200* of the bands of foil material 200 are cut loose, thereby freeing the associated sheet S which can then be seized and transferred to the downstream-located chain conveyor system 3, as discussed hereinabove.

Figure 4B:
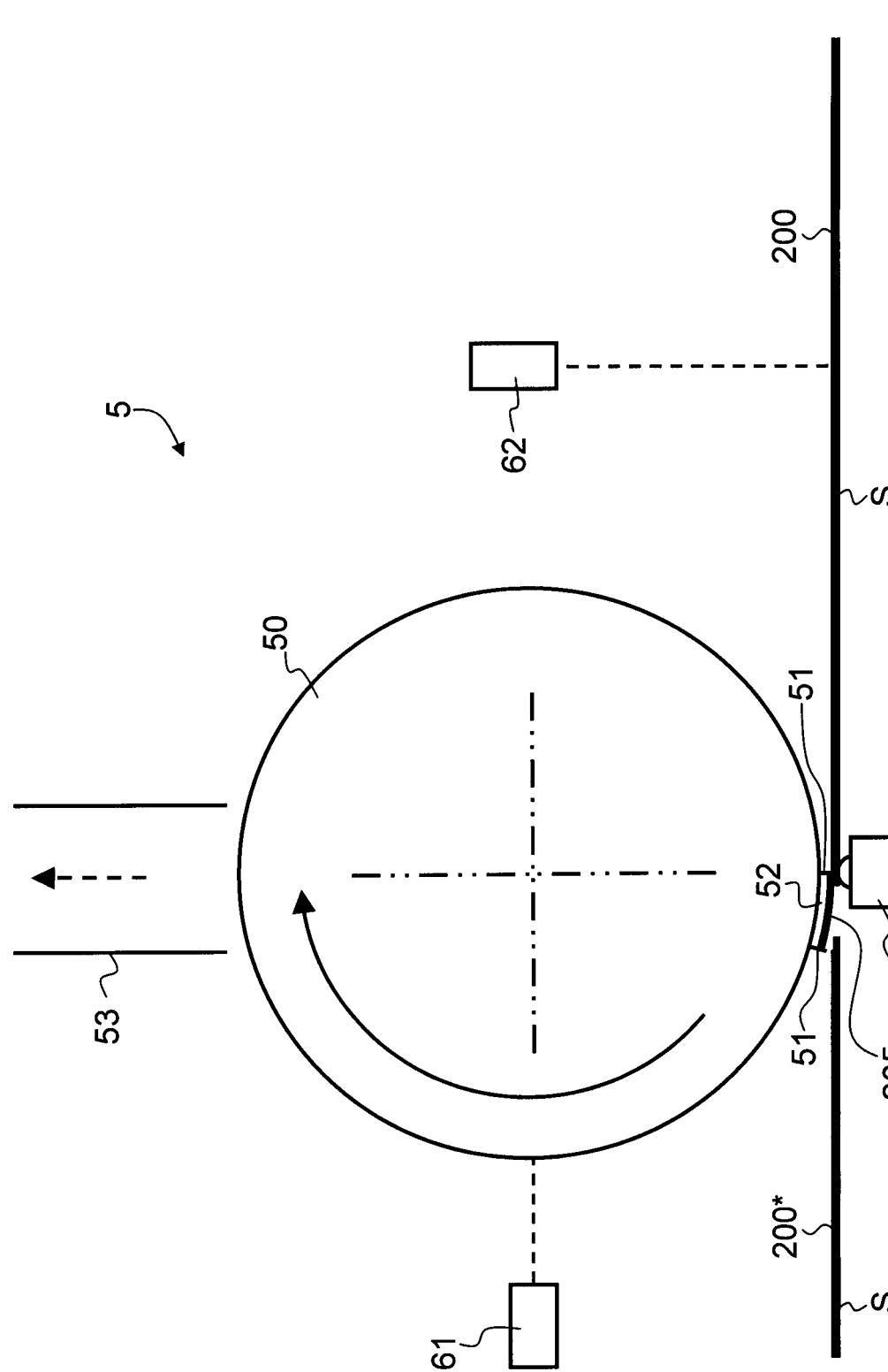

FIG. 4B illustrates a subsequent stage of the processing where the cutting cylinder 50 has been rotated clockwise by a few degrees, thereby bringing the second cutting blade of the cutting tool 51 in contact with the leading portion of the subsequent sheet S which is transported under the cutting cylinder 50, i.e. the position corresponding to the second cutting line C2 depicted in FIG. 2.

Following the cutting operation illustrated in FIG. 4B, a small portion of foil material, designated by reference numeral 205, is cut and separated from the remainder of the band of foil material 200. This small portion 205 is aspirated by the suction portion 52 so as to be carried and evacuated by further rotation of the cutting cylinder 50.

Figure 4C:
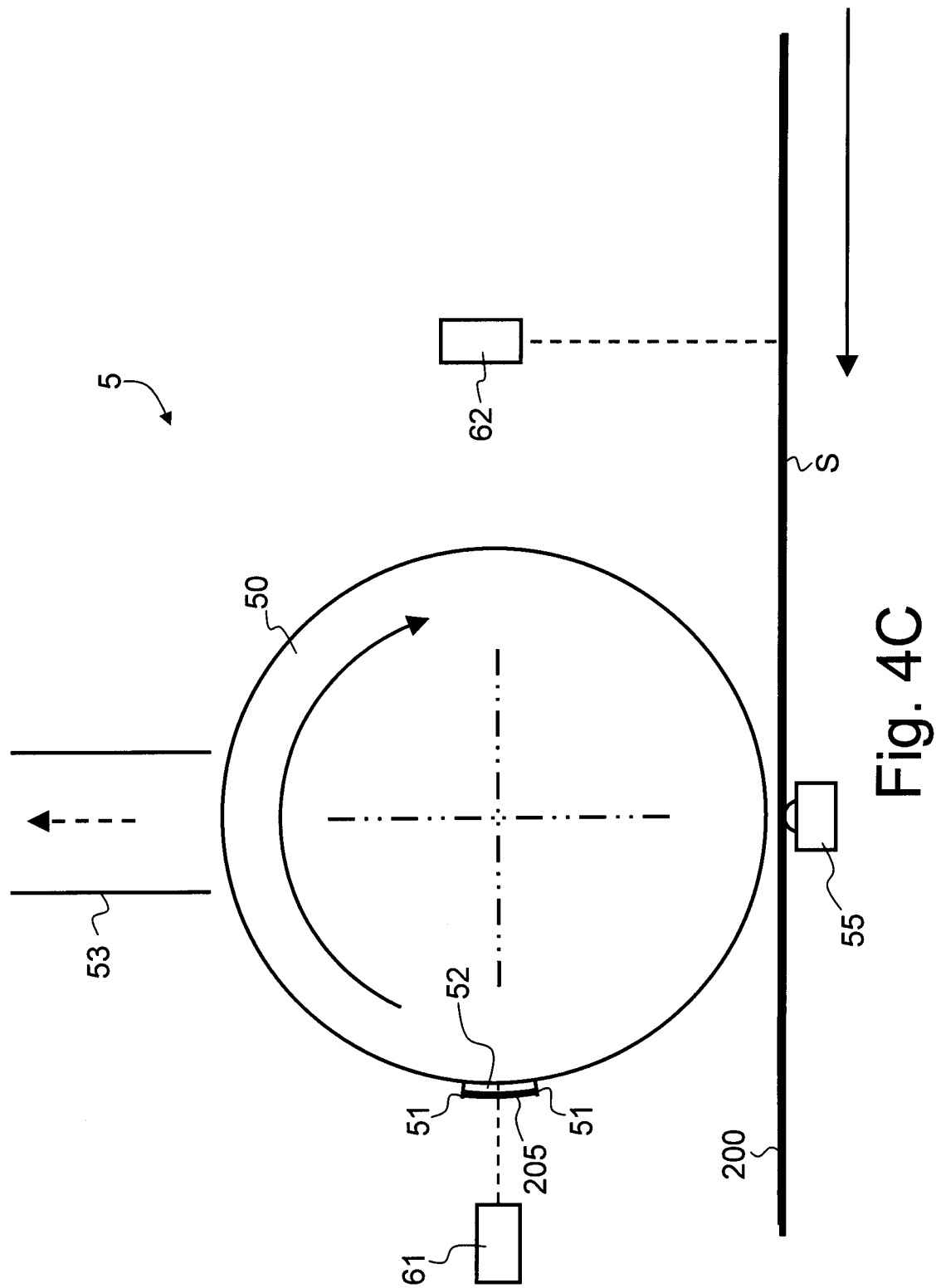

FIG. 4C illustrates a subsequent stage of the processing where the cutting cylinder 50 has been further rotated clockwise by almost ninety degrees, thereby bringing the cutting tool 51 in front of a device 61, the purpose of which is to check for the presence of the small portion of foil material 205 that is being evacuated. This device 61 can be a simple light-emitting device directed towards the surface of the cutting cylinder 50 with a photoreceptor for checking a reflection point of the light beam produced by the light-emitting device. The device 61 could alternatively be a camera for taking a whole picture of the portion of foil material 205 held onto the suction portion 52.

By checking for the presence of the small portion of foil material 205 on the suction portion 52 of the cutting tool 51, one can ensure that the portion 205 is properly being evacuated and is not falling down onto the sheets, which could affect the quality of the processed sheets and/or interfere with the operation of the machine. This control also provides an indication of whether or not the cutting operation was properly carried out.

Figure 4D:
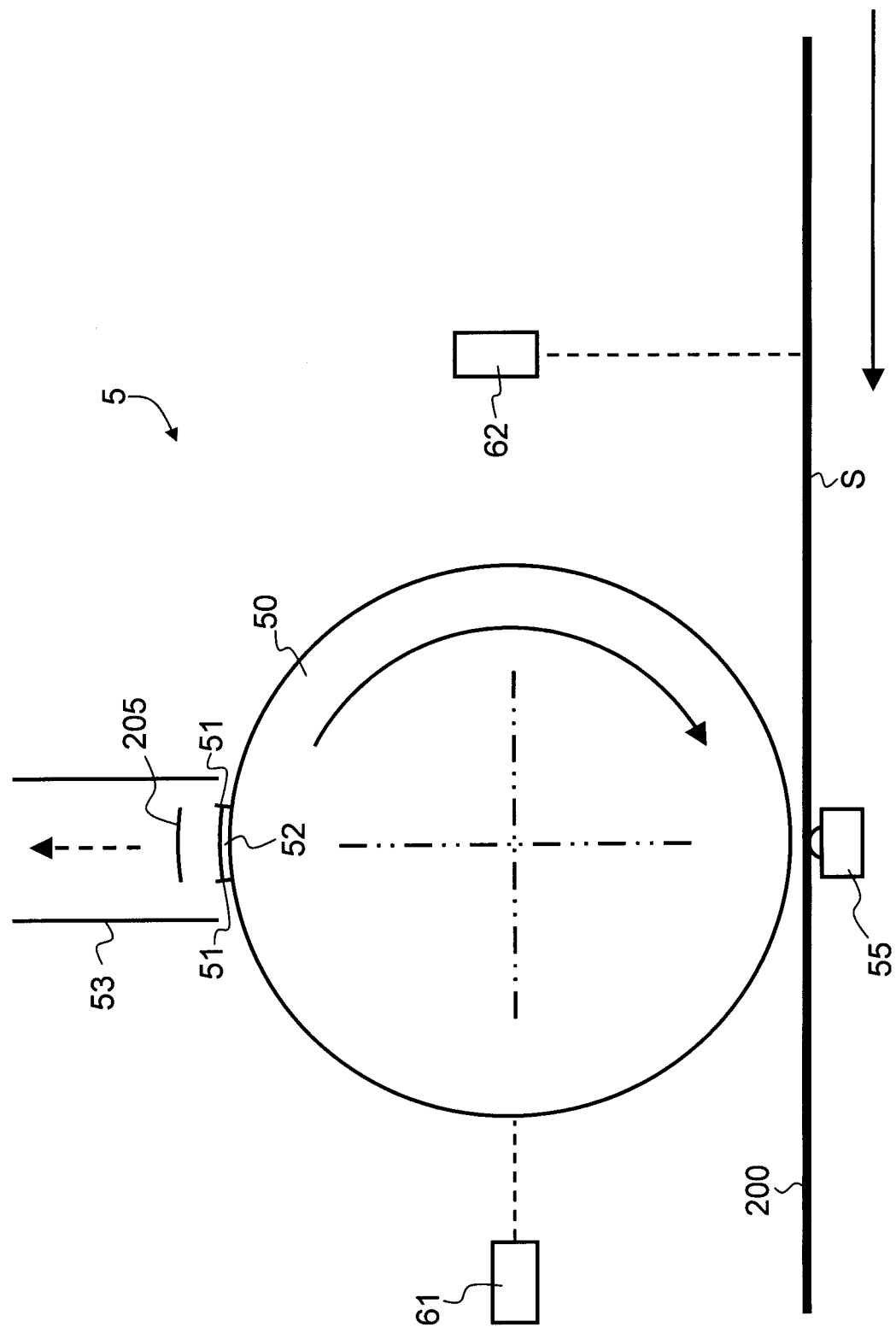

FIG. 4D illustrates still a subsequent stage of the processing where the cutting cylinder 50 has been further rotated clockwise again by approximately ninety degrees, thereby bringing the cutting tool 51 in front of an evacuation system 53 for evacuating the portion of foil material 205, preferably by aspiration. In this position, the operation of the suction portion 52 is interrupted such as to permit aspiration and evacuation of the portion of foil material 205 in the evacuation system 53.

Figure 4E:
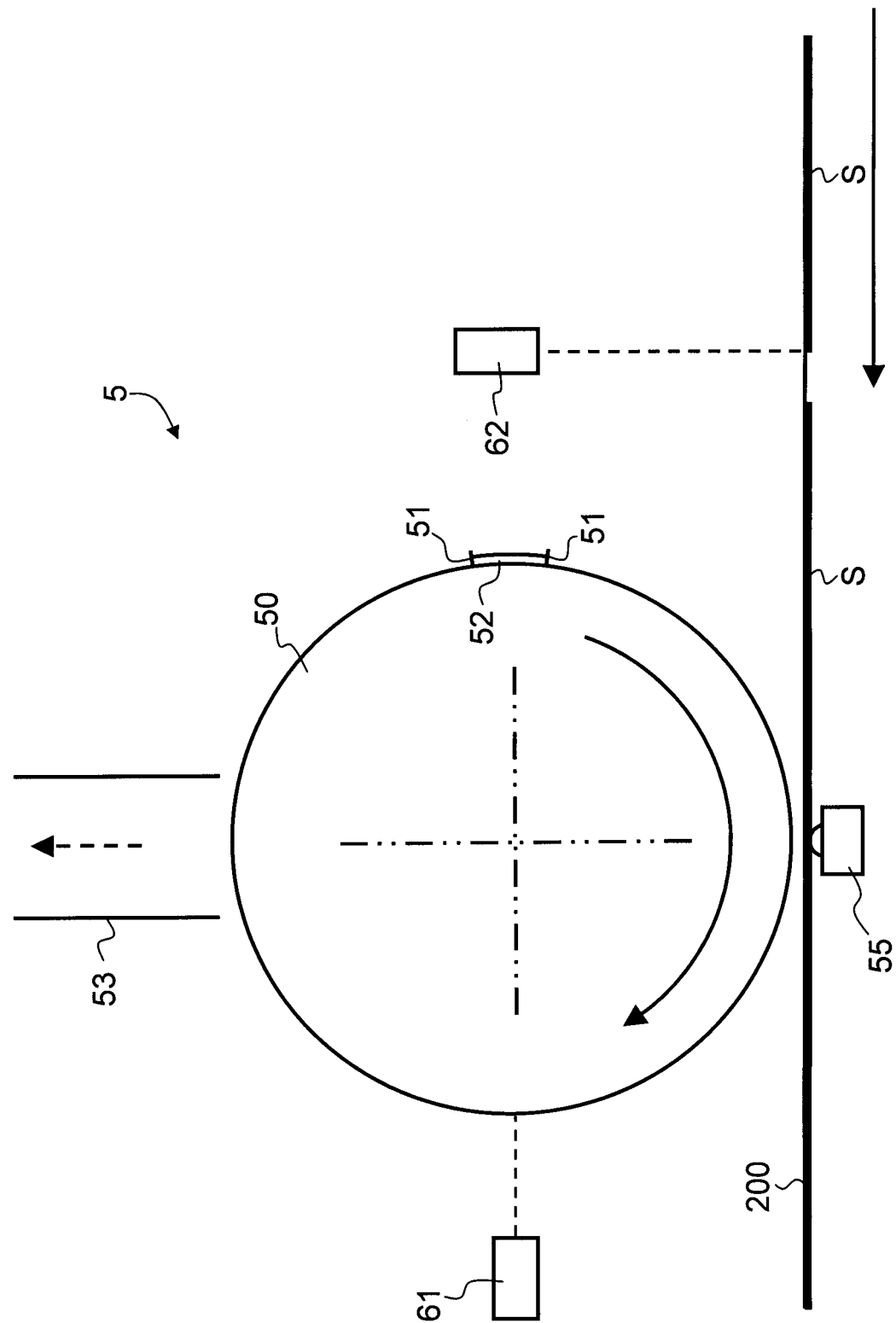

FIG. 4E illustrates yet another subsequent stage of the processing where the cutting cylinder 50 has been further rotated clockwise. In the illustrated situation, the leading edge of a subsequent sheet S coincides with the intersection point of a light beam generated by a second device 62, the purpose of which is to detect the passage of the leading edge of the sheets S. This can be performed by monitoring a reflection point of the light beam generated by the device 62 on the surface of the sheets or by positioning a photoreceptor on the other side of the sheets such as to detect interruption of the light beam caused by passage of the sheets S. The purpose of this detection is to provide an indication of the passage of the sheets and enables adjustment of the operation of the cutting unit 5. More precisely, in the illustrated embodiment, detection of the passage of the leading edge of the sheets S can be used to correct the rotation of the cutting cylinder 50 and ensure that the cutting tool 51 is brought in contact with the sheets and foil material 200 at the appropriate time.

It will of course be understood that one could alternatively detect passage of the trailing edge of the sheets. Still according to an alternate embodiment, one could detect both the passage of the trailing edge of a preceding sheet and the leading edge of a subsequent sheet to thereby provide an indication of the actual distance between two successive sheets S.

Within the scope of the present invention, one could alternatively use a laser-cutting unit to cut the continuous band of foil material 200. This would not necessitate a cylinder as illustrated.

Figure 6:
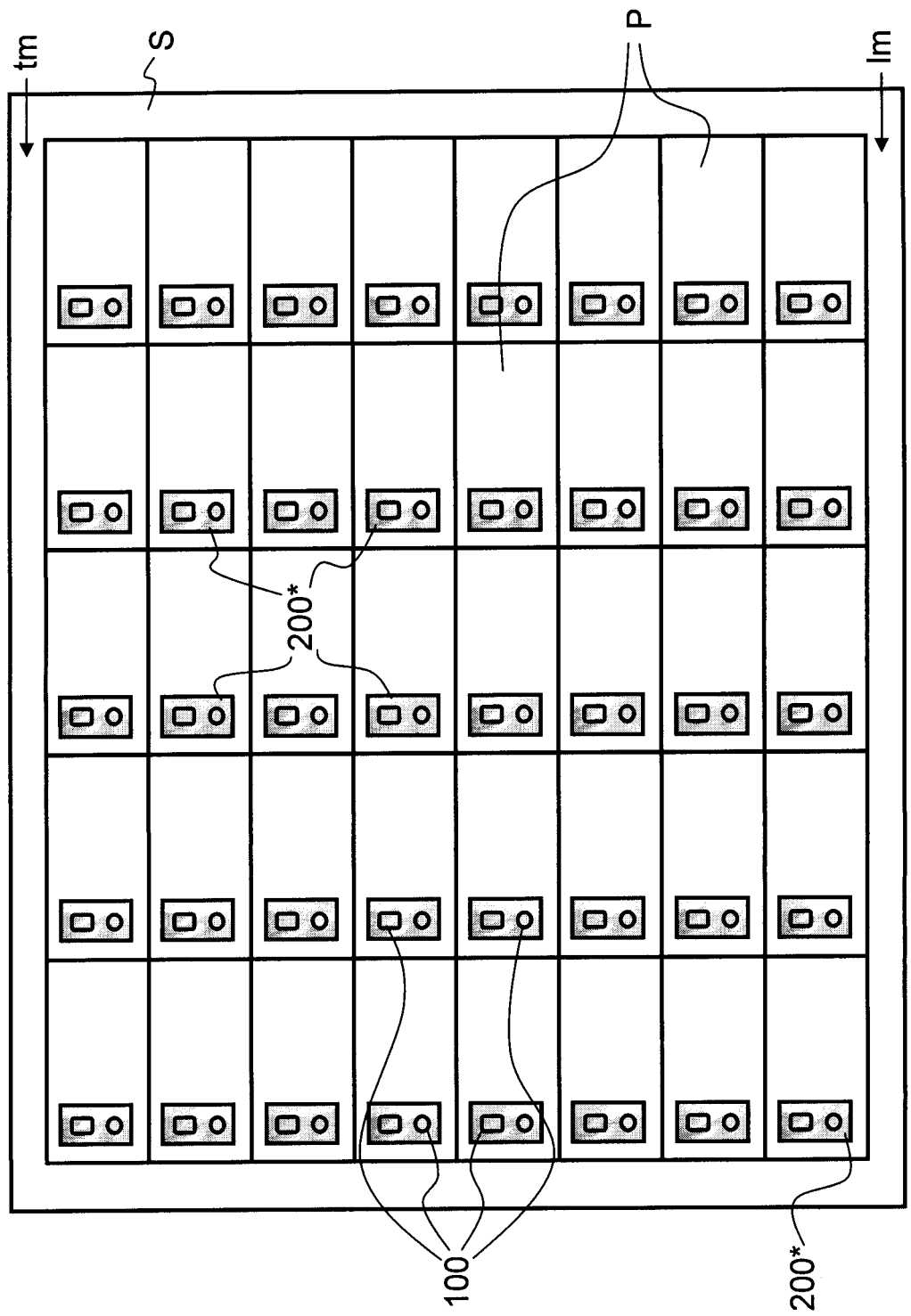
FIG. 6 is a schematic top view of a single sheet after cutting of the plurality of continuous bands of foil material of FIG. 2 according to a variant of the invention.

Still according to an alternate embodiment of the invention, one could cut the continuous bands of foil material 200 at a plurality of locations along the length of the foil material, such that a plurality of distinct portions of foil material 200* are left remaining in each column of imprints P on the sheets, as for instance illustrated in FIG. 6. This is useful in case one wishes to avoid that the foil material 200* extends over the whole height of each imprint P, and be limited to only a small region surrounding the windows 100. One will appreciate that this would require a greater number of cutting operations per sheet. This could for instance be performed by using a corresponding number of cutting tools 51 (whether cutting blades or heating elements) along the circumference of the cutting cylinder 50 (or by appropriately operating a laser-cutting unit).

Figure 7A:
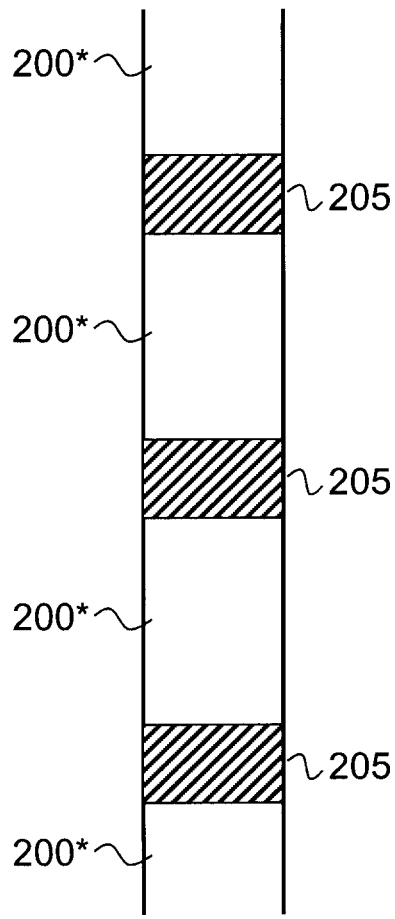
FIGS. 7A and 7B are partial top views of a band of foil material illustrating possible cutting alternatives of the band of foil material.
Figure 7B:
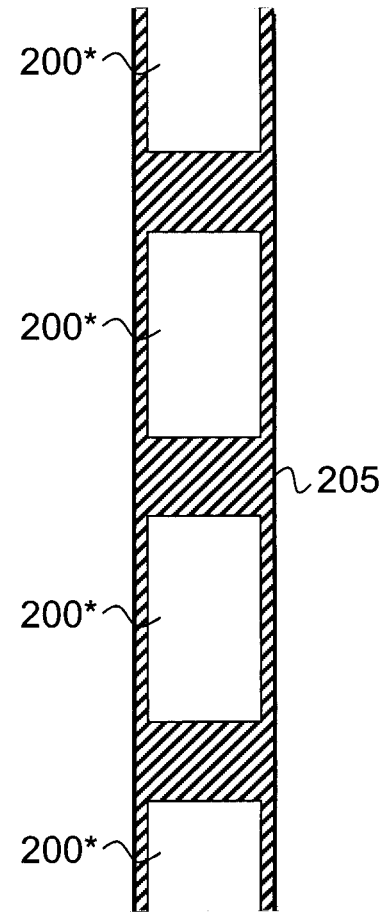

In order to produce the result of FIG. 6, the cutting operations could be carried out over the whole width of the continuous band of foil material 200 as illustrated in FIG. 7A, thereby creating an alternate succession of portions 200* that are to remain on the sheets S and remaining portions 205 that are to be evacuated. Alternatively, the portions of foil material 200* that are to remain on the sheets S could be cut into the continuous band of foil material 200, as illustrated in FIG. 7B, so as to leave a continuous band of foil material 205 that can be evacuated by simply winding this continuous band 205 around an evacuation roll (which would not accordingly require aspiration means to evacuate the remaining portion of the foil material). In this latter case, one will understand that the distinct portions of foil material 200* remaining on the sheets S have a width smaller than the width of the continuous band of foil material 200.

In the context of the present invention, cutting is preferably carried out at locations where the adhesive layer has not been activated, preferably in an immediate vicinity of the portions of foil material that are to remain on the sheets. While peripheral portions of the foil material are not adhering to the sheets after the application process in such a case, the dimensions thereof can be minimized. Furthermore, it is common practice to subject the sheets after application of foil material to an intaglio printing process, especially in order to overprint the foil material. As a result of intaglio printing, the peripheral portions of the foil material are made to adhere to the sheets due to the combined effect of temperature and pressure inherent to intaglio printing.

Various modifications and/or improvements may be made to the above-described embodiments without departing from the scope of the invention as defined by the annexed claims. For instance, as already mentioned, a cutting cylinder is not as such required but constitutes a preferred solution for carrying out the cutting operations using, for example, a mechanical cutting tool. Within the scope of the present invention, any cutting unit could be used as long as it can carry out cutting of the foil material onto the sheets.

It shall furthermore be appreciated that, while the invention is preferably applied with a view to cover windows cut into the sheets, the invention is equally applicable to any other situation where one wishes to apply foil material onto the sheets by lamination, rather than by hot-foil stamping techniques. In particular, the invention could also be applied in the context of the reinforcement of regions of reduced thickness, such as discussed in WO 2004/024464 A1.

Lastly, it might be advantageous to provide an inspection system downstream of the cutting unit for inspecting the quality of the sheets and detecting defects on the sheets, such as improperly cut foil material and/or remaining portions of foil material sticking to the sheets, as the case may be.

The invention claimed is:

1. A method for applying foil material onto successive sheets, comprising the steps of:
transporting individual sheets in succession along a sheet transport path, which individual sheets are not linked to one another;
applying at least one continuous band of foil material onto the individual sheets along a direction substantially parallel to a direction of displacement of said individual sheets, thereby forming a continuous flow of sheets linked to one another by said at least one continuous band of foil material; and cutting said at least one continuous band of foil material such that said continuous flow of sheets is separated into the individual sheets which are not linked to one another with portions of foil material remaining on the sheets, whereby the cutting is performed at positions located on said sheets without cutting through the sheets and such that said portions of foil material remaining on the sheets do not extend beyond leading and trailing edges of the sheets.

2. The method according to claim 1, wherein said at least one continuous band of foil material is cut immediately after a leading edge of the sheets and immediately before a trailing edge of the sheets over a whole width of said at least one continuous band of foil material, such that a continuous portion of foil material is left remaining on each said sheet.

3. The method according to claim 2, wherein cutting is performed in unprinted margins of the sheets.

4. The method according to claim 1, wherein said at least one continuous band of foil material is cut at a plurality of locations along a length of said at least one continuous band of foil material, such that a plurality of distinct portions of foil material are left remaining on each said sheet.

5. The method according to claim 4, wherein said plurality of distinct portions of foil material remaining on the sheets have a width smaller than a width of said at least one continuous band of foil material and wherein a remaining portion of said at least one continuous band of foil material is recuperated.

6. The method according to claim 2, wherein portions of said at least one continuous band of foil material that are not to remain on the sheets are evacuated.

7. The method according to claim 1, wherein said at least one continuous band of foil material is supplied in the form of a roll of foil material.

8. The method according to claim 1, wherein said sheets are sheets carrying an array of imprints arranged in a matrix of rows and columns, and wherein at least one continuous band of foil material is applied along each column of imprints.

9. The method according to claim 1, further comprising the step of cutting windows into said sheets prior to the application of the said at least one continuous band of foil material, which windows are covered by said at least one continuous band of foil material.

10. The method according to claim 1, wherein said at least one continuous band of foil material is substantially transparent.

11. The method according to claim 1, wherein said at least one continuous band of foil material is a plastic laminate comprising an adhesive layer which is brought into contact with the surface of the sheets.

12. The method according to claim 11, wherein said adhesive layer is a pressure-activated and/or thermo-activated adhesive layer which is activated during application only at locations corresponding to the portions of foil material that are to remain on the sheets.

13. The method according to claim 12, wherein cutting of said continuous band of foil material is performed at locations where the adhesive layer has not been activated.

14. An installation for applying foil material onto successive sheets, comprising:
  a sheet-by-sheet feeding station for feeding individual sheets in succession along a sheet transport path, which individual sheets are not linked to one another;
  a foil application unit for applying at least one continuous band of foil material onto said individual sheets along a direction substantially parallel to a direction of displacement of the individual sheets, thereby forming a continuous flow of sheets linked to one another by said at least one continuous band of foil material;
  a cutting unit, located downstream of said foil application unit, for cutting said at least one continuous band of foil material such that the continuous flow of sheets is separated into the individual sheets which are not linked to one another with portions of foil material remaining on the sheets, whereby the cutting unit is performing the cutting at positions located on a surface of the sheets without causing damage to the sheets and such that the portions of foil material remaining on the sheets do not extend up to nor beyond leading and trailing edges of the sheets; and
  a sheet delivery station for receiving the individual sheets.

15. The installation according to claim 14, wherein said cutting unit comprises a cutting cylinder carrying at least one cutting tool on its outer circumference.

16. The installation according to claim 15, wherein said at least one cutting tool comprises at least one cutting blade for mechanically cutting the continuous band of foil material or a heating element for cutting the continuous band of foil material by melting.

17. The installation according to claim 15, wherein a temperature of said cutting cylinder is regulated.

18. The installation according to claim 14, wherein said cutting unit comprises a laser cutting tool.

19. The installation according to claim 14, further comprising means for evacuating portions of the continuous band of foil material that are not to remain on the sheets.

20. The installation according to claim 19, further comprising a device for checking that the portions are properly being evacuated.

21. The installation according to claim 14, further comprising means for checking passage of a leading and/or trailing edge of the sheets and adjusting operation of the cutting unit as a function of the passage of the leading and/or trailing edge of the sheets.

22. The method according to claim 4, wherein portions of said at least one continuous band of foil material that are not to remain on the sheets are evacuated.

23. The installation according to claim 16, wherein a temperature of said cutting cylinder is regulated.

24. The method according to claim 1, wherein the successive sheets are sheets of securities.

25. The method according to claim 6, wherein the portions of said at least one continuous band of foil material that are not to remain on the sheets are evacuated by aspiration.

26. The method according to claim 13, wherein cutting of said continuous band of foil material is performed in an immediate vicinity of the portions of foil material that are to remain on the sheets.

27. The installation according to claim 19, wherein said means evacuate the portions of said at least one continuous band of foil material that are not to remain on the sheets by aspiration.

28. The method according to claim 22, wherein the portions of said at least one continuous band of foil material that are not to remain on the sheets are evacuated by aspiration.

* * * * *